July 7, 1964

C. HUIBRECHTSE 3,140,375

ALTERNATING CURRENT SWITCH HAVING WIPING CONTACTS

Filed May 8, 1962

Inventor:
Cornelis Huibrechtse
by Allard A. Braddock
His Attorney

United States Patent Office 3,140,375
Patented July 7, 1964

3,140,375
ALTERNATING CURRENT SWITCH HAVING
WIPING CONTACTS
Cornelis Huibrechtse, Toronto, Ontario, Canada, assignor to Canadian General Electric Company Limited, Toronto, Ontario, Canada, a corporation of Canada
Filed May 8, 1962, Ser. No. 193,098
8 Claims. (Cl. 200—164)

This invention relates to manually operable electric switches and refers particularly to switches which are suitable for use in alternating current circuits in domestic dwellings.

Many such switches now generally in use have a hollow housing comprising a recessed base of insulating material and a metal mounting strap which serves as a cover for the base as well as the means for supporting the switch in an outlet box. However, this type of switch often encounters problems as far as the manufacture and the assembly of the components are concerned. For instance in assembling the switch, the components have to be inserted into the recessed base commencing with those at the bottom until finally the trigger tops all the components over which the metal strap with its corresponding aperture is placed in order to cover the base and secure the components in the proper positions. This can be a difficult and time consuming operation.

It is, therefore, the principal object of this invention to provide an A.C. switch of a novel construction which permits the easy assembly of the component parts thereof.

According to the invention I have provided a switch which comprises a recessed cover member having a front wall, side walls, end walls, and an open back, an aperture in the front wall for receiving the handle portion of a trigger member pivotally mounted within the cover member, at least two spaced recesses in one of the side walls extending from the back edge thereof for accommodating conductor terminal, contacts attached to the terminals and actuated by the trigger member, spring means for biasing the trigger member into an "ON" or "OFF" position, an insulating plate for closing the open back of the cover member, and an elongated U-shaped supporting strap positioned against the plate and the end walls of the cover member.

My invention will be better understood from the following description taken in connection with the accompanying drawing and its scope will be pointed out in the appended claims.

Figure 3:
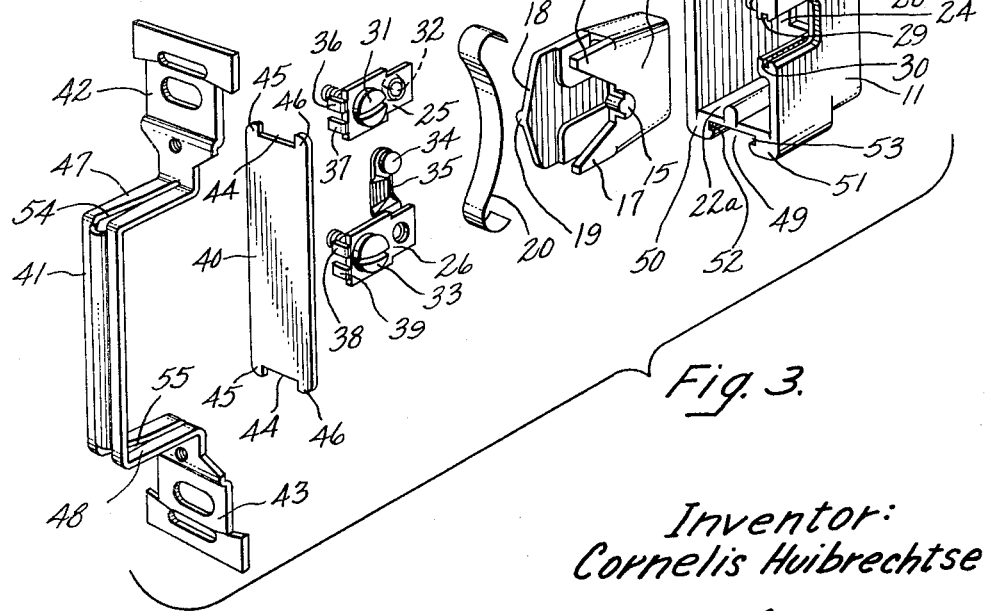
FIG. 3 is an exploded, isometric view of the components included in the new switch.

Referring now in detail to the drawing, the switch of my invention comprises a cover member 11 which may be made of molded phenolic or other suitable insulating material and is hollowed out for the reception of the fixed and movable switch parts. The cover member 11 has a front wall 12 provided with an oblong aperture 13 for receiving the handle portion of a trigger 14. Through the open back of cover member 11, as best shown in FIG. 3, trigger 14 may be inserted so that its handle portion projects through aperture 13 of front wall 12 while two trunnions 15 extending transversely of trigger 14 slide into corresponding open bearings (not shown) furnished on opposed side walls within the recessed cover member 11 to provide a pivotal mounting for the trigger. Trigger 14 is made of a molded insulating material comprising a recessed oblong body of which only the two side walls progress beyond the trunnions 15 into body member 11 to form the actuating portion of the trigger. One of these side walls terminates in two teeth-like projections, an upper projection 16 and a lower projection 17. End 18 of the other side wall is shaped to provide a pair of sloping portions meeting at a centrally located apex 19. Ribs 21 and 22 extend along each end wall of cover member 11 parallel to the side walls thereof to form channels 21a and 22a respectively. A suitably bent spring 20 is placed with its ends retained in said channels 21a and 22a. In this position, the center portion of spring 20 contacts apex 19 on trigger 14 thereby biasing the trigger into an "ON" or "OFF" position.

The side wall of cover member 11 remote from channels 21a and 22a is furnished with at least two spaced recesses 23 and 24 of rectangular or preferably square shape which extend from the back edge of the side wall and are adapted to receive conductor terminals 25 and 26 which slide into grooves 27, 28, 29, and 30 formed in the walls of the recesses. Terminal 25 includes a terminal screw 31 to which a conductor wire may be connected, and a fixed contact 32 which is connected directly to the terminal such as by riveting. Terminal 26 includes a terminal screw 33 and a movable contact 34 connected to the free end of a resilient contact arm 35 secured to terminal 26 and extending transversely therefrom. In the assembled state contact 34 is pressed against contact 32 due to the resiliency of contact arm 35. The exposed ends of each terminal 25 and 26 are provided with a pair of tongues 36, 37 and 38, 39 respectively.

The open back of cover member 11 is closed by an insulating member or plate 40 which is held in place by a yoke or supporting strap 41. The supporting strap 41 is shown as a U-shaped member with end portions 42 and 43 having openings to facilitate connection with corresponding portions or ears of an outlet box, for instance, positioned in the wall of a building. Recesses 44 are provided at each end of the insulating plate 40 through which legs 47 and 48 of strap 41 extend. Projections 45 and 46 grip the legs 47 and 48.

Figure 1:
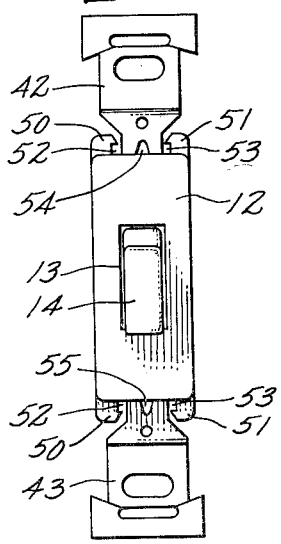
FIG. 1 is a front elevation of a switch embodying the invention.
Figure 2:
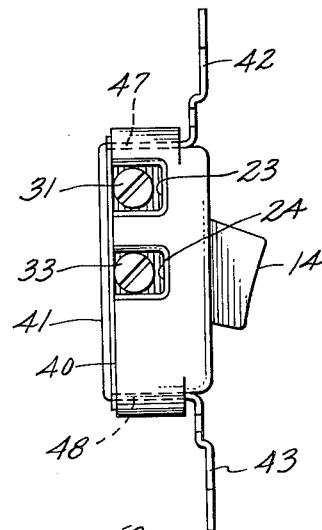
FIG. 2 is a side elevation of the switch of FIG. 1.

Projections 50 and 51 on each end wall of cover member 11 provide recesses 49 through which the legs 47 and 48 of strap 41 extend when the switch is assembled. Undercut grooves 52 and 53 are formed in the inside walls of projections 50 and 51 respectively. These grooves are provided with a slight taper, the deepest portion of the grooves being located adjacent the front wall 12 of cover member 11 as best seen in FIG. 1. These grooves thereby provide space in which strap legs 47 and 48 may be expanded so as to secure all components of the switch in a fixed position when assembled. For this purpose, the strap legs 47 and 48 are equipped with slots 54 and 55 into which a blade tool may be inserted to spread the strap legs into the grooves 52 and 53.

In assembling the new switch, body member 11 is placed in a position with its open back directed upwards, and then the switch parts may be inserted in the order indicated in FIG. 3. Trigger 14 is dropped into cover member 11 so that its handle portion projects out of aperture 13 and its trunnions 15 slide into the open bearings. Spring 20 is inserted with its ends sliding in the channels 21a and 22a. The center portion of spring 20 presses resiliently against one of the sloping portions of end 18 of trigger 14 and biases the trigger into an "ON" or "OFF" position. The spring also provides some support for the bearing on this side of the trigger. Conductor terminal 26 is placed into the recess 24 by sliding it with its side edges into the grooves 29 and 30 whereby the lower end of the terminal provides a solid support for the bearing on the other side of trigger 14. Upon the subsequent insertion of the conductor terminal 25 in grooves 27 and 28 of recess 23, contact arm 35 of terminal 26 must be lifted away from the side wall of cover member 11 so that the contact 32 may slide beneath contact 34. Upon release of contact arm 35 contacts 32 and 34 are securely pressed together in "ON" position. In operating the switch, contact 34 may be lifted from and returned to the "ON" position by the upper tooth-like projection 16 of trigger 14 which extends into the space between contact arm 35 and the side wall of the cover member 11.

Insulating plate 40 is next placed over the open back of cover member 11, thereby pressing against the tongues 36 to 39 on terminals 25 and 26. Finally, support strap 41 is placed over the cover member with its legs 47 and 48 extending through the recesses 49 to retain the switch components in position. Upon the insertion of a blade tool into the slots 54 and 55, the legs 47 and 48 may be expanded into the grooves 52 and 53 at each end of the cover member.

It will be evident that the new switch design described herein makes possible an easy and time saving assembly operation. During each stage of assembly each component remains in the proper position until the support strap has been added and locked in place without requiring the assembler to hold it. Another advantage is that the terminals may be inserted into the body member without the removal of their screws as customarily required.

Further, the contact members of most prior art switches are placed in a horizontal plane and a cam on the trigger is used to push the two contact members apart. However, in the new switch design the contact members are placed so that they lie in a vertical plane when the switch is mounted in an outlet box in the building wall, and the tooth-like projection of the trigger operates on the contact members by applying a force which has a component perpendicular to the plane of the contact surfaces and a component parallel to this plane. Therefore, the contact members are separated by a wiping action which provides a self-cleaning feature.

Location of one of the contacts directly on the terminal in close proximity to the terminal screw means that the heat created by the arc during opening and closing the switch is transferred directly to the terminal screw and thus to the conductor wire. This gives a large cooling surface which will keep the temperature of the contacts below the welding point.

Finally, the manner in which the trigger member is held in place tends to give a slight floating action to the trigger. That is, one side of the trigger member is held by the biasing spring which thereby provides a resilient support, and the other side of the trigger is held by the lower edge of one of the terminal plates which thereby provides a solid support. This floating action allows for a much freer operation of the trigger which is very important in A.C. switches because of the light contact pressures therein involved.

While the preceding disclosure has been directed to a particular embodiment of the invention it will be understood that various modifications may be made therein. For instance, a third recess may be added in the cover member to accommodate a third terminal to provide a double-poled A.C. switch in which case the lower tooth-like projection of the trigger member would provide the actuating member for the second set of contact members. It is, therefore, intended to cover in the appended claims all such modifications as fall within the scope of the invention.

What I claim as new and desire to secure by Letters Patent of the United States is:

1. An electric switch comprising a recesesd insulating cover member having a front wall, side walls, end walls, and an open back, an aperture in said front wall for receiving the handle portion of a trigger member pivotally mounted within said cover member, at least two spaced notches in one of said side walls extending from the back edge thereof for accommodating conductor terminals, contact members attached to said terminals and capable of actuation by said trigger member, spring means located within said cover member and in contact with said trigger member for cooperation therewith so as to bias said trigger member into an "ON" or "OFF" position, an insulating plate for closing the open back of said cover member, and a U-shaped supporting strap secured against said insulating plate and the end walls of said cover member.

2. The electric switch as defined in claim 1 wherein the contact member for one of the terminals is positioned directly on the terminal so as to provide a large cooling surface.

3. The electric switch as defined in claim 1 wherein the trigger member actuates said contact member by applying a force having a component extending perpendicular to the plane of the contact surfaces and a component extending parallel thereto so as to provide a wiping action on the contact surfaces.

4. An electric switch comprising a recessed insulating cover member having a front wall, side walls, end walls, and an open back, an aperture in said front wall for receiving the handle portion of a trigger member pivotally mounted within said cover member, at least two spaced notches in one of said side walls extending from the back edge thereof for accommodating conductor terminals, contact members attached to said terminals and capable of actuation by said trigger member, spring means located within said cover member and in contact with said trigger member for cooperation therewith so as to bias said trigger member into an "ON" or "OFF" position, said trigger member being pivotally mounted by means of trunnions extending transversely therefrom, which are positioned in open bearings provided on opposed walls within said recessed cover member, and secured therein at one side by said biasing spring means and at the other side by one of said conductor terminals, an insulating plate for closing the open back of said cover member, and a U-shaped supporting strap secured against said insulating plate and the end walls of said cover member.

5. An electric switch comprising a recessed insulating cover member having a front wall, side walls, end walls, and an open back, an aperture in said front wall for receiving the handle portion of a trigger member pivotally mounted within said cover member, at least two spaced notches in one of said side walls extending from the back edge thereof for accommodating conductor terminals, contact members attached to said terminals and capable of actuation by said trigger member, spring means located within said cover member and in contact with said trigger member for cooperation therewith so as to bias said trigger member into an "ON" or "OFF" position, an insulating plate for closing the open back of said cover member, and a U-shaped supporting strap secured against said insulating plate and the end walls of said cover member, the leg portions of said U-shaped supporting strap extending through recesses provided by projections on each end wall of said cover member and undercut grooves are formed in the inside walls of said projections having a slight taper and their deepest portion adjacent the front wall of said cover member into which the leg portions may be expanded by means of a blade tool forcibly inserted into slots provided in said leg portions.

6. An electric switch comprising a recessed cover member having a front wall, side walls, end walls, and an open back, an aperture in said front wall for receiving the handle portion of a trigger member pivotally mounted within said cover member, at least two spaced recesses in one of said side walls extending from the back edge thereof for accommodating conductor terminals, a first contact member mounted directly on one or more of said terminals, at least one resilient contact arm secured to a second terminal and extending towards said terminal carrying a first contact member in a direction substantially parallel to the side wall of said cover member, a second contact member mounted at the free end of said resilient contact arm such that said second contact member is located opposite said first contact member in the assembled state, projection means on said trigger member extending into the space between each resilient contact arm and said side wall and adapted to actuate said resilient contact arm so as to lift the contact member, positioned at its free end, from said first contact member when the trigger member is moved from an "ON" position to an "OFF" position of the switch, a leaf spring having arcuate ends and a bowed center portion located within said cover member and in contact with said trigger member for cooperation therewith so as to bias said trigger member into an "ON" or "OFF" position, an insulating plate for closing the open back of said cover member, and a U-shaped supporting strap secured against said insulating plate and the end walls of said cover member.

7. An electric switch as claimed in claim 6 wherein the resilient arm has a cam surface engageable by the projection means on the trigger member.

8. An electric switch comprising a recessed insulating cover member having a front wall, side walls, end walls, and an open back, an aperture in said front wall for receiving the handle portion of a trigger member, a trigger member pivotally mounted within said cover member, said trigger member having a V-shaped cam surface at the bottom thereof, at least two spaced recesses in one of said side walls extending from the back edge thereof for accommodating conductor terminals, a first contact member mounted directly on one or more of said terminals, at least one resilient contact arm secured to a second terminal and extending toward said terminal carrying a first contact member in a direction substantially parallel to the side wall of said cover member, a second contact member mounted at the free end of said resilient contact arm such that said second contact member is located opposite said first contact member in the assembled state, projection means on said trigger member extending into the space between each resilient contact arm and said side wall and adapted to actuate said resilient contact arm so as to lift the contact member positioned at its free end from said first contact member when the trigger member is moved from an "ON" position to an "OFF" position of the switch, a leaf spring having arcuate ends and a bowed center portion located within said cover member and in contact with the cam surface of said trigger member for cooperation therewith so as to bias said trigger member into an "ON" or "OFF" position, an insulating plate for closing the open back of said cover member, and a U-shaped supporting strap secured against said insulating plate and the end walls of said cover member.

References Cited in the file of this patent
UNITED STATES PATENTS

| | | |
|---|---|---|
| 1,500,888 | Nero | July 8, 1924 |
| 1,662,422 | Hodges | Mar. 13, 1928 |
| 2,365,120 | Thirlwell | Dec. 12, 1944 |
| 2,669,613 | Despard | Feb. 16, 1954 |
| 2,967,215 | Whiting | Jan. 3, 1961 |
| 2,969,443 | Barden et al. | Jan. 24, 1961 |